US010661227B2

(12) United States Patent
Park et al.

(10) Patent No.: US 10,661,227 B2
(45) Date of Patent: May 26, 2020

(54) METHOD FOR PRODUCING LITHIUM HYDROXIDE AND LITHIUM CARBONATE

(71) Applicant: RESEARCH INSTITUTE OF INDUSTRIAL SCIENCE & TECHNOLOGY, Pohang-si (KR)

(72) Inventors: Sung Kook Park, Pohang-si (KR); Kwang Seok Park, Pohang-si (KR); Sang Gil Lee, Pohang-si (KR); Woo Chul Jung, Pohang-si (KR); Ki Young Kim, Pohang-si (KR); Hyun Woo Lee, Pohang-si (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 278 days.

(21) Appl. No.: 15/573,523

(22) PCT Filed: May 11, 2016

(86) PCT No.: PCT/KR2016/004926
§ 371 (c)(1),
(2) Date: Nov. 13, 2017

(87) PCT Pub. No.: WO2016/182337
PCT Pub. Date: Nov. 17, 2016

(65) Prior Publication Data
US 2018/0147531 A1    May 31, 2018

(30) Foreign Application Priority Data
May 13, 2015    (KR) .................. 10-2015-0066922

(51) Int. Cl.
*C01D 15/08*    (2006.01)
*B01D 61/44*    (2006.01)
(Continued)

(52) U.S. Cl.
CPC ......... *B01D 61/445* (2013.01); *B01D 61/025* (2013.01); *B01D 61/44* (2013.01);
(Continued)

(58) Field of Classification Search
CPC ...... B01D 61/445; B01D 61/46; C01D 15/02; C01D 15/08; C01D 7/00
See application file for complete search history.

(56) References Cited

U.S. PATENT DOCUMENTS

| 6,331,236 B1 | 12/2001 | Mani |
| 2012/0055806 A1 | 3/2012 | Fischer et al. |
| 2014/0227154 A1* | 8/2014 | Harrison .................. C01D 7/00 423/179.5 |

FOREIGN PATENT DOCUMENTS

| CL | 201702736 | 6/2018 |
| CN | 102036739 | 4/2011 |

(Continued)

OTHER PUBLICATIONS

Ryabtsev et al, "Preparation of High-Purity Lithium Hydroxide Monohydrate from Technical-Grade Lithium Carbonate by Membrane Electrolysis," Russian Journal of Applied Chemistry, vol. 77, No. 7, 2004, pp. 1108-1116 (Year: 2004).*

(Continued)

*Primary Examiner* — Salil Jain
(74) *Attorney, Agent, or Firm* — Lex IP Meister, PLLC

(57) ABSTRACT

The present invention relates to a method for producing lithium hydroxide and lithium carbonate, wherein the lithium hydroxide and the lithium carbonate can be produced by a series of steps of: performing bipolar electrodialysis of a lithium-containing solution from which divalent ion impurities have been removed; concentrating lithium in the lithium-containing solution and at the same time, con- (Continued)

verting the lithium to lithium hydroxide; and carbonating the lithium hydroxide to obtain lithium carbonate.

18 Claims, 3 Drawing Sheets

(51) Int. Cl.
  *C01D 15/02* (2006.01)
  *C01D 7/00* (2006.01)
  *B01D 61/58* (2006.01)
  *B01D 61/46* (2006.01)
  *B01D 61/02* (2006.01)

(52) U.S. Cl.
  CPC ............. *B01D 61/46* (2013.01); *B01D 61/58* (2013.01); *C01D 7/00* (2013.01); *C01D 15/02* (2013.01); *C01D 15/08* (2013.01); *B01D 2311/04* (2013.01); *B01D 2311/25* (2013.01); *B01D 2311/2642* (2013.01); *B01D 2317/02* (2013.01); *C01P 2006/80* (2013.01)

(56) References Cited

FOREIGN PATENT DOCUMENTS

| CN | 103864249 | 6/2014 |
|---|---|---|
| CN | 103882468 | 6/2014 |
| CN | 104557621 | 4/2015 |
| EP | 3290393 | 3/2018 |
| JP | 2009-231238 | 10/2009 |
| JP | 2009-270189 | 11/2009 |
| JP | 2011-031232 | 2/2011 |
| JP | 2012-092004 | 5/2012 |
| JP | 2012-171827 | 9/2012 |
| JP | 2012171827 A * | 9/2012 |
| KR | 10-2011-0036772 | 4/2011 |
| KR | 10-2011-0131214 | 12/2011 |
| KR | 10-2012-0063069 | 6/2012 |
| KR | 10-2013-0078176 | 7/2013 |
| KR | 10-2013-0092323 | 8/2013 |
| RU | 2157338 | 10/2000 |
| RU | 2470878 | 12/2012 |
| WO | 2013-159194 | 10/2013 |
| WO | 2013-177680 | 12/2013 |
| WO | 2014-138933 | 9/2014 |

OTHER PUBLICATIONS

EPO, Extended European Search Report of EP 16792983.5 dated Apr. 1, 2019.

Federal Service for Intellectual Property, Office Action of the corresponding Russian Patent Application No. 2017142987., dated Sep. 18, 2018.

* cited by examiner

METHOD FOR PRODUCING LITHIUM HYDROXIDE AND LITHIUM CARBONATE

TECHNICAL FIELD

A method for producing lithium hydroxide and lithium carbonate is disclosed.

BACKGROUND ART

In order to commercially manufacture lithium carbonate having a purity of a predetermined concentration or greater in a commercial view, lithium in a lithium-containing solution needs to be concentrated to an appropriate concentration degree for carbonation, while impurities in the solution are removed.

However, a cost for removing the impurities and concentrating the lithium takes most of the entire cost, and thus research on solving this problem is continuously being made.

Specifically, a technology of removing the impurities and concentrating the lithium by evaporating brine with solar heat has been suggested. However, when the brine evaporation depends on natural evaporation, it takes a long time of one year or more, and thus in order to solve this time problem, a vast evaporation equipment (for example, an artificial pond for the evaporation and the like) is required, and accordingly, a high cost for an equipment investment, an operation, a maintenance, and the like are additionally needed.

In order to replace this natural evaporation, a method of producing lithium carbonate by producing lithium phosphate from brine and then, chemically dissolving it has been suggested. However, since the lithium phosphate is not only known to have very low solubility and thus very difficult to chemically dissolve, but the chemically-dissolved solution also includes lithium in a low concentration, a concentration process through an evaporation is necessarily required.

Accordingly, a new technology replacing the concentration process through evaporation is required to economically manufacture lithium carbonate having a predetermined concentration, but an effective alternative has not been suggested yet.

DISCLOSURE

Technical Problem

The present inventors are to suggest an effective alternative capable of replacing the evaporation method to economically manufacture the lithium carbonate.

Specifically, in an embodiment of the present invention, a method of producing lithium hydroxide includes performing bipolar electrodialysis of a lithium-containing solution from which divalent ion impurities are removed, concentrating lithium in the lithium-containing solution, and at the same time, converting the lithium to lithium hydroxide.

In another embodiment of the present invention, a method of producing lithium carbonate includes carbonating the produced lithium hydroxide to obtain lithium carbonate.

Technical Solution

In an embodiment of the present invention, a method for producing lithium hydroxide includes chemically purifying a lithium-containing solution to remove divalent ion impurities; and performing bipolar electrodialysis of a lithium-containing solution from which divalent ion impurities are removed, concentrating lithium in the lithium-containing solution, and at the same time, converting the lithium to lithium hydroxide, wherein the bipolar electrodialysis is performed using a bipolar electrodialysis device including an anode cell containing an anode, a first bipolar membrane, an anion selective-type dialysis membrane, a cation selective-type dialysis membrane, a second bipolar membrane, a cathode cell containing a cathode in a sequential order, an acidic solution tank outside the anode cell, and a basic solution tank outside the cathode cell, wherein a solution between the first bipolar membrane and the anion selective-type dialysis membrane is circulated through the acidic solution tank, and a solution between the second bipolar membrane and the cation selective-type dialysis membrane is circulated through the basic solution tank, the step of performing bipolar electrodialysis of a lithium-containing solution from which divalent ion impurities are removed, concentrating lithium in the lithium-containing solution, and at the same time, converting the lithium to lithium hydroxide includes injecting the lithium-containing solution from which divalent ion impurities are removed between the anion selective-type dialysis membrane and the cation selective-type dialysis membrane in the bipolar electrodialysis device and injecting pure water between the first bipolar membrane and the anion selective-type dialysis membrane and between the second bipolar membrane and the cation selective-type dialysis membrane, respectively; and applying a current to the bipolar electrodialysis device to which lithium-containing solution from which divalent ion impurities are removed and the pure water are injected to form an acidic solution between the first bipolar membrane and the anion selective-type dialysis membrane and to form a basic solution including the lithium hydroxide between the cation selective-type dialysis membrane and the second bipolar membrane, and a weight ratio of an amount of pure water relative to an amount of the lithium-containing solution from which divalent ion impurities are removed (pure water: lithium-containing solution from which divalent ion impurities are removed) is 1:1 to 1:5.

Specifically, the step of applying a current to the bipolar electrodialysis device into which a lithium-containing solution from which divalent ion impurities are removed and the pure water are injected to form an acidic solution between the first bipolar membrane and the anion selective-type dialysis membrane and to form a basic solution including the lithium hydroxide between the cation selective-type dialysis membrane and the second bipolar membrane may include a step of hydrolyzing the pure water on each surface of the first bipolar membrane and the second bipolar membrane to generate a proton and a hydroxide ion; a step of moving a lithium ion in the lithium-containing solution from which divalent ion impurities are removed toward the cathode direction through the cation selective-type dialysis membrane; a step concentrating the hydroxide ion generated from the surface of the second bipolar membrane and the moved lithium ion between the cation selective-type dialysis membrane and the second bipolar membrane to form the lithium hydroxide; a step of moving an anion in the lithium-containing solution from which divalent ion impurities are removed through the anion selective-type dialysis membrane toward the anode direction; and a step of concentrating the proton generated on the surface of the first bipolar membrane and the moved anion between the first bipolar membrane and the anion selective-type dialysis membrane to form the acidic solution.

Herein, a concentration of lithium in the solution containing the lithium hydroxide may be greater than or equal to 5 g/L.

On the other hand, after the step of performing bipolar electrodialysis of a lithium-containing solution from which divalent ion impurities are removed, concentrating lithium in the lithium-containing solution, and at the same time, converting the lithium to lithium hydroxide, the method may further include concentrating the solution containing the lithium hydroxide to crystallize the same; and drying the crystallized lithium hydroxide to obtain lithium hydroxide in a powder form.

On the other hand, after the step of performing bipolar electrodialysis of a lithium-containing solution from which divalent ion impurities are removed, concentrating lithium in the lithium-containing solution, and at the same time, converting the lithium to lithium hydroxide, the method may further include performing electrodialysis of the solution containing the lithium hydroxide to concentrate lithium in the solution containing the lithium hydroxide.

In the step of performing electrodialysis of the solution containing the lithium hydroxide to concentrate lithium in the solution containing the lithium hydroxide, a remaining solution after the electrodialysis may be concentrated by a reverse osmosis method and reused in the electrodialysis.

On the other hand, the step of chemically purifying the lithium-containing solution to remove divalent ion impurities may include a primary chemical purification of putting calcium hydroxide to the lithium-containing solution; and a secondary chemical purification of putting caustic soda, sodium carbonate, or sodium sulfate in the primarily chemically purified lithium-containing solution.

The removed divalent ion impurities may be at least one selected from the group including a magnesium ion, a sulfuric acid ion, and a calcium ion.

Herein, the lithium-containing solution may be selected from a group consisting of a sea-dissolved-lithium extracting solution, a waste lithium battery recycle process solution, a lithium ore extracting solution, brine, and a combination thereof.

In another embodiment of the present invention, a method of producing lithium carbonate includes chemically purifying a lithium-containing solution to remove divalent ion impurities; performing bipolar electrodialysis of a lithium-containing solution from which divalent ion impurities are removed, concentrating lithium in the lithium-containing solution and at the same time, and converting the lithium to lithium hydroxide; and carbonating a solution containing the lithium hydroxide to precipitate lithium carbonate, wherein the bipolar electrodialysis is performed using a bipolar electrodialysis device including an anode cell containing an anode, a first bipolar membrane, an anion selective-type dialysis membrane, a cation selective-type dialysis membrane, a second bipolar membrane, and a cathode cell containing a cathode in a sequential order, an acidic solution tank outside the anode cell, and a basic solution tank outside the cathode cell, wherein a solution between the first bipolar membrane and the anion selective-type dialysis membrane is circulated through the acidic solution tank, and a solution between the second bipolar membrane and the cation selective-type dialysis membrane is circulated through the basic solution tank, the step of performing bipolar electrodialysis of a lithium-containing solution from which divalent ion impurities are removed, concentrating lithium in the lithium-containing solution, and at the same time, converting the lithium to lithium hydroxide includes injecting the lithium-containing solution from which divalent ion impurities are removed, between the anion selective-type dialysis membrane and the cation selective-type dialysis membrane of the bipolar electrodialysis device; injecting pure water between the first bipolar membrane and the anion selective-type dialysis membrane and between the second bipolar membrane and the cation selective-type dialysis membrane, respectively; and applying a current to the bipolar electrodialysis device to which lithium-containing solution from which divalent ion impurities are removed and the pure water are injected to form an acidic solution between the first bipolar membrane and the anion selective-type dialysis membrane and to form a basic solution including the lithium hydroxide between the cation selective-type dialysis membrane and the second bipolar membrane, and a weight ratio of an amount of pure water relative to an amount of the lithium-containing solution from which divalent ion impurities are removed (pure water:lithium-containing solution from which divalent ion impurities are removed) is 1:1 to 1:5.

Specifically, the step of forming the acidic solution between the first bipolar membrane and the anion selective-type dialysis membrane and the basic solution including the lithium hydroxide between the cation selective-type dialysis membrane and the second bipolar membrane by applying a current to the bipolar electrodialysis device in which the lithium-containing solution from which divalent ion impurities are removed and the pure water are put may include a step of generating a proton and a hydroxide ion through a hydrolysis on each surface of the first bipolar membrane and the second bipolar membrane; a step of passing a lithium ion the lithium-containing solution from which divalent ion impurities are removed through the cation selective-type dialysis membrane and moving it toward the cathode direction; a step of concentrating a hydroxide ion generated on the surface of the second bipolar membrane and the moved lithium ion between the cation selective-type dialysis membrane and the second bipolar membrane and forming a basic solution including the lithium hydroxide; a step of passing an anion in the lithium-containing solution from which divalent ion impurities are removed and moving it toward the anode direction; a step of concentrating a proton generated on the surface of the first bipolar membrane and the moved anion between the first bipolar membrane and the anion selective-type dialysis membrane and forming the acidic solution.

Herein, a concentration of lithium in the solution containing the lithium hydroxide may be greater than or equal to 5 g/L.

On the other hand, after the performing bipolar electrodialysis of a lithium-containing solution from which divalent ion impurities are removed, concentrating lithium in the lithium-containing solution, and at the same time, converting the lithium to lithium hydroxide, the method may further include removing monovalent ion impurities in the solution containing the lithium hydroxide.

In this regard, the step of removing monovalent ion impurities in the precipitated lithium carbonate may be performed using a solubility difference.

On the other hand, after the step of performing bipolar electrodialysis of a lithium-containing solution from which divalent ion impurities are removed, concentrating lithium in the lithium-containing solution, and at the same time, converting the lithium to lithium hydroxide, the method may further include performing electrodialysis of the solution containing the lithium hydroxide to concentrate lithium in the solution containing the lithium hydroxide.

In the step of performing electrodialysis of the solution containing the lithium hydroxide to concentrate lithium in the solution containing the lithium hydroxide, a remaining solution after the electrodialysis, a remaining solution after the electrodialysis may be concentrated by a reverse osmosis method and reused in the electrodialysis The step of carbonating a solution containing the lithium hydroxide to precipitate lithium carbonate may be performed by injecting sodium carbonate or carbon dioxide into the solution containing the lithium hydroxide.

After the step of carbonating a solution containing the lithium hydroxide to precipitate lithium carbonate, the method may further include hot-water washing the precipitated lithium carbonate to obtain lithium carbonate from which monovalent ion impurities are removed.

In the step of hot-water washing the precipitated lithium carbonate to obtain lithium carbonate from which monovalent ion impurities are removed, a remaining solution after the hot-water washing may be used for the step of carbonating.

On the other hand, the step of chemically purifying a lithium-containing solution to remove divalent ion impurities may include a primary chemical purification step of putting calcium hydroxide to the lithium-containing solution; and a secondary chemical purification step of putting caustic soda, sodium carbonate, or sodium sulfate in the primarily chemically purified lithium-containing solution.

The removed divalent ion impurities may be at least one selected from the group including a magnesium ion, a sulfuric acid ion, and a calcium ion.

Herein, the lithium-containing solution may be selected from a group consisting of a sea-dissolved-lithium extracting solution, a wasted lithium battery recycle process solution, a lithium ore extracting solution, brine, and a combination thereof.

Advantageous Effects

Each material may be obtained with high purity and a high concentration through a manufacturing method of the material according to embodiments of the present invention.

Specifically, according to an embodiment of the present invention, a method for producing lithium hydroxide may be provided by economically concentrating lithium in the lithium-containing solution and at the same time, converting the lithium to lithium hydroxide through bipolar electrodialysis of the lithium-containing solution from which divalent ion impurities are removed compared with evaporation.

According to an embodiment of present invention, a method of producing lithium carbonate may be provided by simply carbonating the produced lithium hydroxide.

MODE FOR INVENTION

Figure 1:
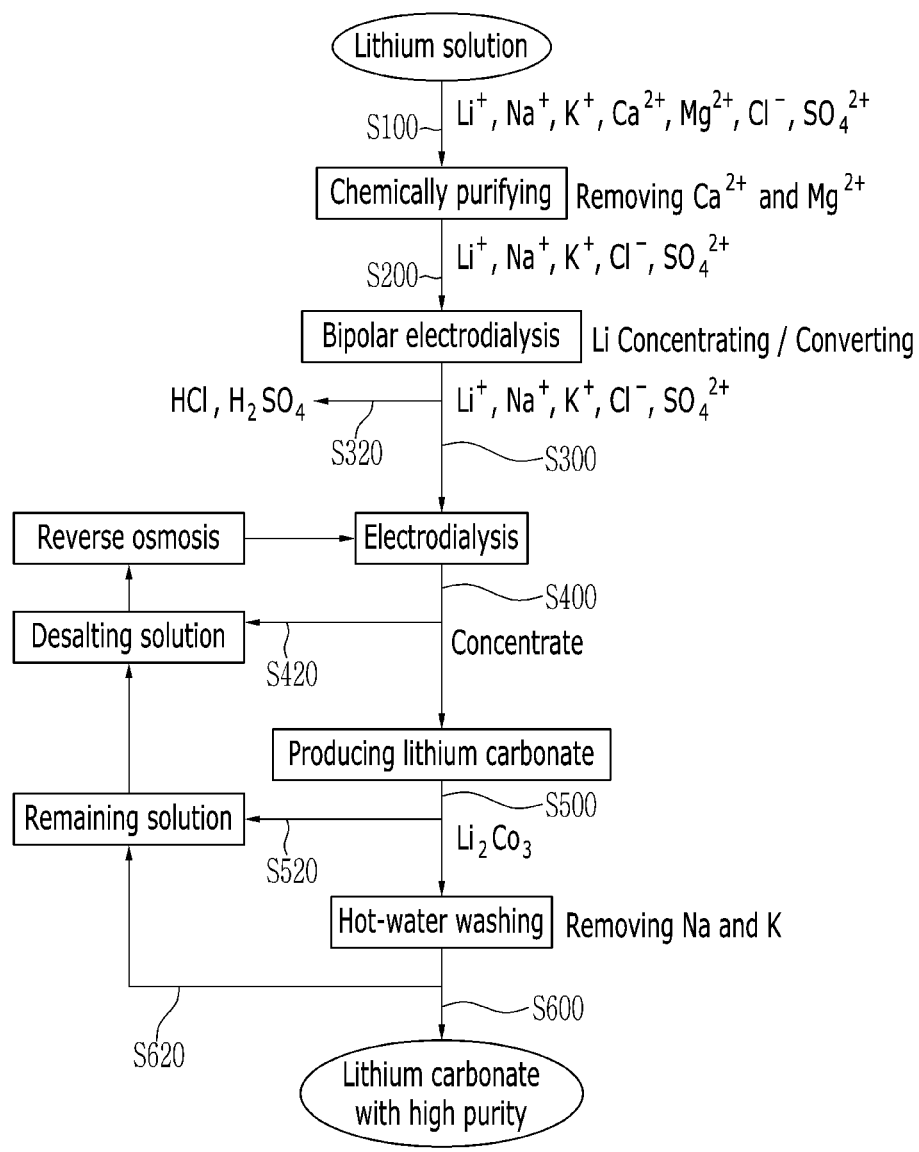
FIG. 1 is a flowchart comprehensively summarizing a method for producing lithium hydroxide and lithium carbonate according to embodiments of the present invention.

Hereinafter, embodiments of the present invention are described in detail. However, these embodiments are exemplary, the present invention is not limited thereto and the present invention is defined by the scope of claims.

Unless otherwise defined, all terms (including technical and scientific terms) used herein have the same meaning as commonly understood by a person skilled in the art. Through the specification, unless explicitly described to the contrary, the word "comprise" and variations such as "comprises" or "comprising" will be understood to imply the inclusion of stated elements but not the exclusion of any other elements. Further, the singular forms are intended to include the plural forms as well, unless the context clearly indicates otherwise.

As aforementioned, the concentration process through a natural evaporation is inappropriate for economically manufacturing lithium carbonate having purity of greater than or equal to a predetermined concentration, and thus an alternative method is required.

The present inventors are to suggest a series method of performing a bipolar electrodialysis about the lithium-containing solution from which divalent ion impurities are removed to concentrate lithium in the lithium-containing solution and at the same time, convert the lithium into lithium hydroxide and then, carbonating the lithium hydroxide to obtain lithium carbonate.

Specifically, the bipolar electrodialysis may converts lithium in a lithium-containing solution into lithium hydroxide as well as concentrates lithium in a high concentration for a short time compared with the aforementioned concentration process through an evaporation, and thus lithium carbonate may be easily obtained through a simple post process (i.e., the carbonation process).

Regarding this, embodiments of the present invention provide each method for producing lithium hydroxide and lithium carbonate, which is generally summarized in FIG. 1, and hereinafter, the method of producing each material is illustrated referring to FIG. 1.

First of all, a step of removing divalent ion impurities by chemically purifying a lithium-containing solution is illustrated;

The lithium-containing solution generally includes $Li^+$, $Na^+$, $K^+$, $Ca^{2+}$, $Mg^{2+}$, $Cl^-$, $SO_4^{2-}$, and the like. Herein, all the other components except for the $Li^+$ may be regarded as impurities in a process of producing lithium chloride, lithium hydroxide, and lithium carbonate according to the embodiments of the present invention, and particularly, during the process of producing the lithium carbonate, the impurities is carbonated together and precipitated along with lithium carbonate and thus, needs to be removed.

Among the impurities, $Ca^{2+}$ and $Mg^{2+}$ may be precipitated on the surface of a cation selective-type dialysis membrane at the side of a basic solution tank of a bipolar electrodialysis device, which will be described later, and thus contaminate the membrane as well as have low solubility and are hardly remove through hot-water washing and accordingly, need to be removed first of all.

A method of removing the $Ca^{2+}$ and the $Mg^{2+}$ is not particularly limited but may be performed according to Reaction Schemes 1 to 3 and the like.

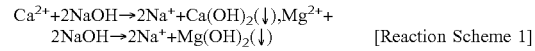

[Reaction Scheme 1]

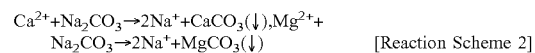

[Reaction Scheme 2]

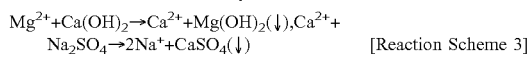

Considering Reaction Schemes 1 to 3, $Ca^{2+}$ and the $Mg^{2+}$ may be precipitated as $Ca(OH)_2$, $Mg(OH)_2$, $CaCO_2$, $MgCO_3$, $CaSO_4$, and the like by injecting NaOH, $Na_2CO_3$, $Ca(OH)_2$, $Na_2SO_4$, and the like sequentially and appropriately to the lithium-containing solution. When the $Ca^{2+}$ and $Mg^{2+}$ are selectively separated and removed, $Li^+$, $Na^+$, $K^+$, and $Cl^-$ still remain in the lithium-containing solution.

A process of concentrating lithium in a high concentration and simultaneously converting it into lithium hydroxide by using the lithium-containing solution from which the divalent ion impurities are removed is illustrated as follows.

The lithium-containing solution from which the divalent ion impurities are removed may be converted into an aqueous lithium hydroxide solution through the bipolar electrodialysis without an input of separate chemicals. The lithium-containing solution from which the divalent ion impurities are removed is respectively converted into an acidic solution including HCl, $H_2SO_4$, and the like and a basic solution including LiOH, NaOH, KOH, and the like and separate the acidic solution and the basic solution.

Simultaneously, lithium in the basic solution may be concentrated by circulating the acidic solution and the basic solution at least as many as possible, while the lithium-containing solution from which the divalent ion impurities are removed is circulated at most as many as possible in the bipolar electrodialysis device.

Figure 2:
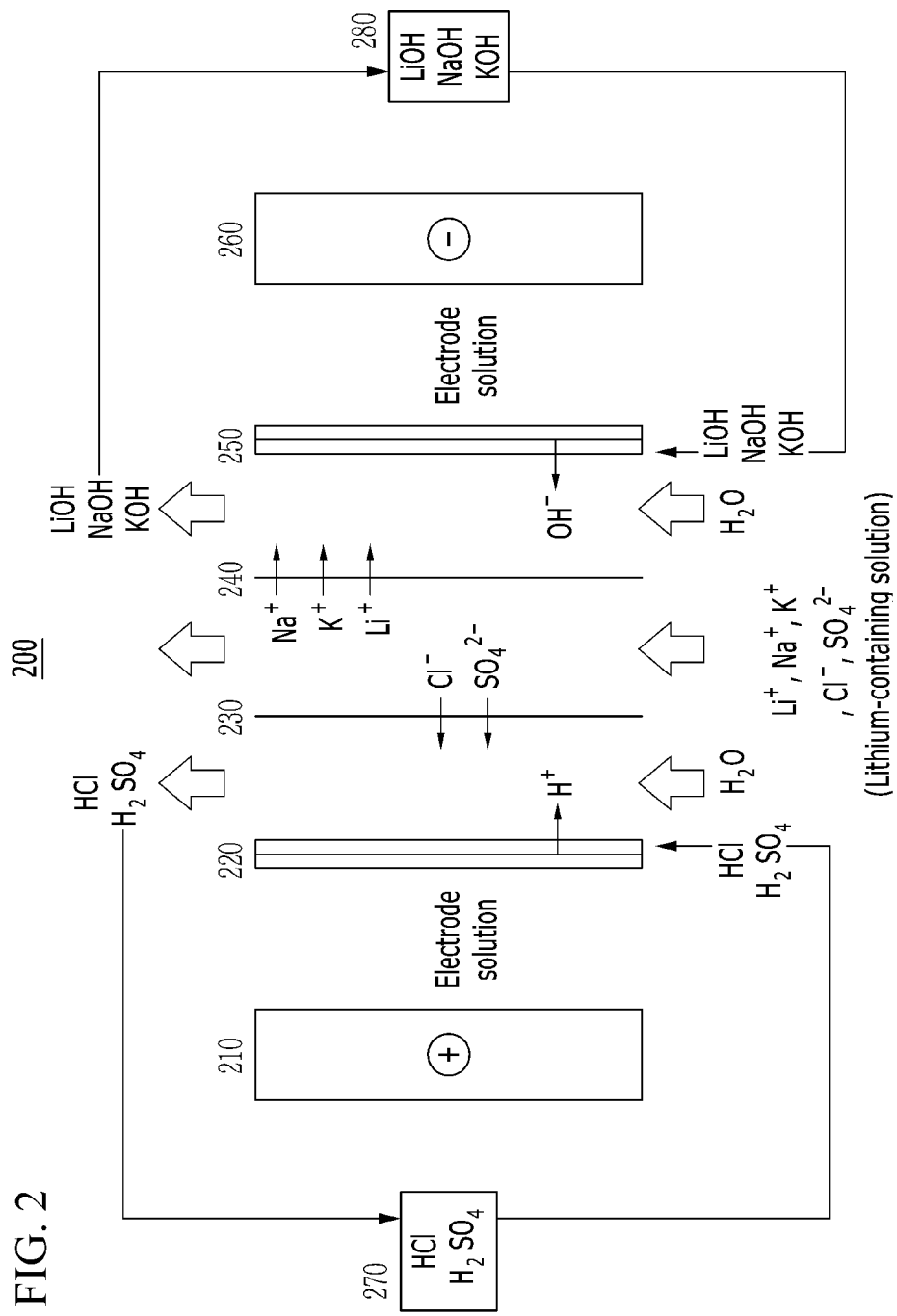
FIG. 2 comprehensively shows a method of converting a lithium-containing solution into a lithium hydroxide-containing solution by using a bipolar electrodialysis device according to an example embodiment of the present invention.

For the circulation, the bipolar electrodialysis device schematically shown in FIG. 2 may be used. Specifically, the bipolar electrodialysis device 200 includes an anode cell containing an anode 210, a first bipolar membrane 220, an anion selective-type dialysis membrane 230, a cation selective-type dialysis membrane 240, a second bipolar membrane 250, a cathode cell containing a cathode 260 in a sequential order, an acidic solution tank 270 outside the anode cell, and a basic solution tank 280 outside the cathode cell. Particularly, in the bipolar electrodialysis device, a solution between the first bipolar membrane 220 and the anion selective-type dialysis membrane 230 is circulated through the acidic solution tank and a solution between the cation selective-type dialysis membrane 240 and the second bipolar membrane 250 is circulated through the basic solution tank.

Herein, the lithium-containing solution from which divalent ion impurities are removed is injected between the anion selective-type dialysis membrane 230 and the cation selective-type dialysis membrane 240 and the pure water is injected between the first bipolar membrane 220 and the anion selective-type dialysis membrane 230 and the cation selective-type dialysis membrane 240 and the second bipolar membrane 250, respectively.

In this way, when a current is applied to the bipolar electrodialysis device which the lithium-containing solution from which the divalent ion impurities are removed and the pure water are put in, an acidic solution is formed between the anion selective-type dialysis membrane 230 and the first bipolar membrane 220, while a basic solution including the lithium hydroxide is formed between the cation selective-type dialysis membrane 240 and the second bipolar membrane 250. The formation and separation of the acidic solution and the basic solution are illustrated as follows.

First of all, the pure water is hydrolysized on each surface of the first bipolar membrane 220 and the second bipolar membrane 250 and thus generates a proton and a hydroxide ion, and a lithium ion in the lithium-containing solution from which the divalent ion impurities are removed passes the cation selective-type dialysis membrane 240 and moves toward the cathode 260. This moved lithium ion is concentrated along with the hydroxide ion generated on the surface of the second bipolar membrane 250 between the cation selective-type dialysis membrane 240 and the second bipolar membrane 250 to form the basic solution including lithium hydroxide.

Independently, an anion in the lithium-containing solution from which the divalent ion impurities are removed passes the anion selective-type dialysis membrane 230 and moves toward the anode 210 and then, is concentrated along with the proton generated on the surface of the first bipolar membrane 220 between the first bipolar membrane 220 and the anion selective-type dialysis membrane 230 and forms the acidic solution.

On the other hand, a weight ratio of an amount of the pure water relative to an amount of the lithium-containing solution from which the divalent ion impurities are removed (pure water:lithium-containing solution from which divalent ion impurities are removed) is controlled in a range of 1:1 to 1:5, and as a result, a lithium concentration in the obtained basic solution may be five times as high as its initial lithium concentration. However, when the weight ratio is greater than 1:5, the obtained basic solution has a high concentration close to a saturation concentration and thus may cause a negative reaction such as gas generation, deterioration of current efficiency, and the like.

Herein, an amount of the pure water indicates a sum amount of pure water respectively input between the first bipolar membrane 220 and the anion selective-type dialysis membrane 230 and between the cation selective-type dialysis membrane 240 and the second bipolar membrane 250.

When the amount of the pure water is less than the range, the basic solution may have an extremely high lithium concentration and thus a concentration difference causing a diffusion force, which may increase a voltage, decrease a current, reduce current efficiency, increase an electricity cost, and the like. On the contrary, when the pure water is used in an excessive amount beyond, the obtained basic solution may have an extremely low concentration and thus require an additional concentration process for manufacturing lithium hydroxide and lithium carbonate, which may bring about a considerable energy cost.

As aforementioned, lithium in the basic solution obtained through the bipolar electrodialysis is concentrated in five times or more as high as its initial concentration, which is appropriately high enough to convert the lithium into lithium carbonate through a carbonation process.

Specifically, the basic solution needs to have a lithium concentration of greater than or equal to 5 g/L to convert lithium therein into lithium carbonate through the carbonation process, and the lithium concentration of greater than or equal to 5 g/L may be reached through the bipolar electrodialysis. Particularly, the lithium concentration may reach greater than or equal to 30 g/L through the bipolar electrodialysis, and herein, when the obtained basic solution is carbonated, lithium carbonate may be obtained with a considerable yield. The carbonation process is illustrated later.

However, even through the lithium concentration of the obtained basic solution stays at less than 5 g/L, lithium therein may be converted into lithium carbonate through the carbonation process after an additional concentration process.

In other words, when the bipolar electrodialysis process has a sufficient lithium concentration for carbonation (i.e., after the bipolar electrodialysis, a basic solution has a lithium concentration of greater than or equal to 5 g/L, the additional concentration process may be omitted, but when the lithium concentration is insufficient for carbonation (i.e., after the bipolar electrodialysis, the basic solution has a lithium concentration of less than 5 g/L), the lithium concentration may be immediately sufficient enough for carbonation through the additional concentration process, and accordingly, the bipolar electrodialysis may more reduce a concentration cost than the solar evaporation.

The additional concentration process is to concentrate lithium sufficiently enough for carbonation by treating the obtained basic solution in an electrodialysis method.

In other words, when the lithium concentration in the bipolar electrodialysis process is insufficient for carbonation (i.e., after the bipolar electrodialysis, a solution has a lithium concentration of less than 5 g/L), lithium may be concentrated sufficiently enough for carbonation through the electrodialysis (i.e., after the electrodialysis, the solution may have a lithium concentration of greater than or equal to 5 g/L).

Regarding this, in a lithium concentration section of less than 5 g/L, which is less than or equal to its solubility, after the bipolar electrodialysis, the electrodialysis process may more reduce a cost of concentrating lithium than an evaporation (particularly, a vacuum evaporation) process.

Specifically, a vacuum evaporation process consumes energy with an extremely high cost due to generation of evaporation latent heat (specifically, evaporation latent heat of water is 539 kcal/kg), but the electrodialysis process consumes no unnecessary energy cost due to the evaporation latent heat, for lithium is not concentrated through movement of ions.

Figure 3:
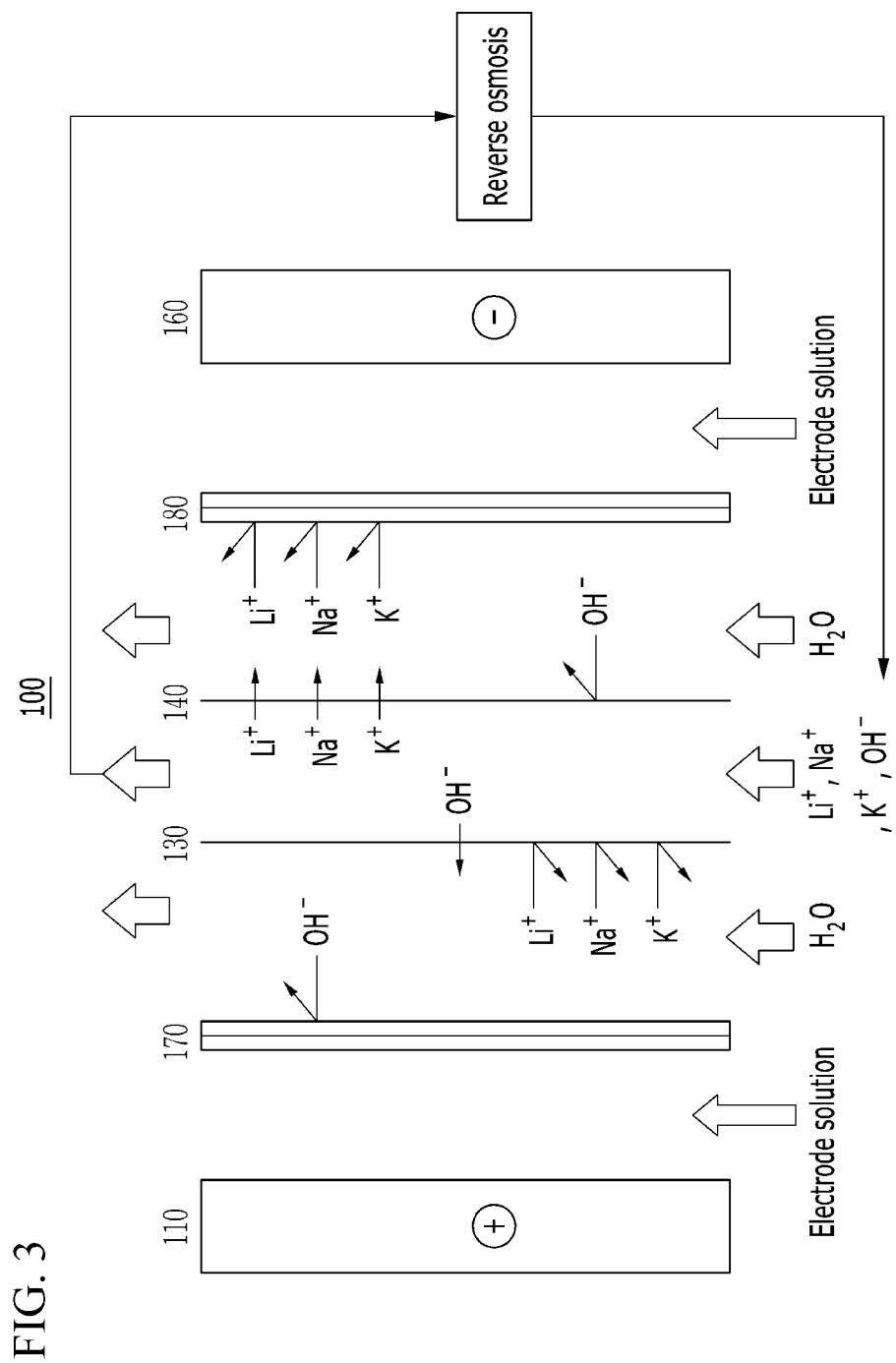
FIG. 3 comprehensively shows a method of concentrating the lithium hydroxide containing solution by using the electrodialysis device according to an example embodiment of the present invention.

For the electrodialysis process, an electrodialysis device 100 schematically shown in FIG. 3 may be used. The monovalent ion selective electrodialysis device 100 includes an anode 110, a monovalent anion selective dialysis membrane 130, a monovalent cation selective dialysis membrane 140, a cathode 160, a cation selective membrane 170, and an anion selective membrane 180. Specifically, when a current is applied to the electrodialysis device by putting the obtained basic solution therein, an anion moves toward the anode, while a cation moves toward the cathode due to an electrophoresis effect.

By the way, this electrodialysis process needs to be performed after the bipolar electrodialysis process. When the lithium-containing solution from which the divalent ion impurities are removed is immediately electrodialysized, primary ion impurities such as $Na^+$, $K^+$, and the like may be concentrated during the electrodialysis process and precipitated into chloride such as NaCl, KCl and the like and thus contaminate a dialysis membrane.

The precipitation of chloride of NaCl, KCl, and the like is caused by $Cl^-$ in the lithium-containing solution from which the divalent ion impurities are removed and thus may be settled by performing the bipolar electrodialysis before the electrodialysis.

The reason is that since $Cl^-$ in the lithium-containing solution from which the divalent ion impurities are removed is converted into $OH^-$ in the bipolar electrodialysis, primary ion impurities such as $Na^+$, $K^+$, and the like have increased solubility despite the electrodialysis and thus are not precipitated as hydroxide such as NaOH, KOH, and the like.

For specific examples, the lithium-containing solution from which the divalent ion impurities are removed has NaCl solubility of 220 g/L, but the NaOH solubility after the bipolar electrodialysis process is increased up to 1100 g/L.

On the other hand, the obtained basic solution after the bipolar electrodialysis process may be treated through an electrodialysis and primarily separated into a lithium concentrated solution and a desalting solution. Herein, since a small amount of lithium still remains in the primarily separated desalting solution, the solution may be concentrated in a reverse osmosis method and circulated again through the electrodialysis process to completely recover this remaining lithium.

Herein, the reverse osmotic pressure method may be preferable to a concentration of a low concentration solution, and the concentration and circulation processes may be repeated in the reverse osmotic pressure method during the electrodialysis to concentrate lithium up to a concentration ratio of 2:1 to 40:1 (concentration solution:the desalting solution) between the concentration solution and the desalting solution.

The reason that the concentration ratio is limited within the range is to efficiently concentrate lithium through the electrodialysis process. When the concentration ratio is out of the range or less than the range, ions may rarely move during the electrodialysis process, a resistance may be generated in the electrodialysis device, and thus a solution temperature and a voltage may be increased.

Specifically, when the concentration ratio is greater than 40:1, a diffusion force due to a concentration difference may be excessively generated in a reverse direction, but when the concentration ratio is less than 2:1, the diffusion force in the reverse direction may rarely be generated, and thus ions may hardly move through the electrodialysis.

As aforementioned, a finally obtained concentration solution through the bipolar electrodialysis process or the additional concentration process after the bipolar electrodialysis process has a lithium concentration of greater than or equal to 5 g/L. This concentration solution having a lithium concentration of greater than or equal to 5 g/L (hereinafter, referred to be a "final concentration solution") proceeds to a carbonation process and thus may be converted into lithium carbonate, which will be illustrated as follows.

When carbon dioxide or sodium carbonate is added to the final concentration solution, lithium carbonate may be easily precipitated. Herein, as a remaining solution of the carbonating process, a basic solution including $CO_3^{2-}$, $Na^+$, $K^+$, and the like is generated and may be used as a raw material solution for producing sodium carbonate, potassium carbonate sodium hydroxide, potassium hydroxide, and the like.

However, since the final concentration solution is hydroxide mixed with monovalent ion impurities such as $Na^+$, $K^+$, and the like as well as $Li^+$, sodium carbonate ($Na_2CO_3$), potassium carbonate ($K_2CO_3$), and the like as well as lithium carbonate ($Li_2CO_3$) are precipitated together and mixed in the precipitated lithium carbonate. Herein, a byproduct such as the sodium carbonate ($Na_2CO_3$), potassium carbonate ($K_2CO_3$), and the like may be removed through hot-water washing to recover lithium carbonate with high purity.

The hot-water washing may be performed by using a solubility difference, since lithium carbonate has lower solubility as a temperature is increased, while sodium carbonate and potassium carbonate have higher solubility as the temperature is increased. For example, lithium carbonate has 0.85 g of solubility in 100 g of water ($H_2O$) at 80° C., sodium carbonate has 44 g of solubility in 100 g of water ($H_2O$) at 80° C., and potassium carbonate 140 g of solubility in 100 g of water ($H_2O$) at 80° C.

The monovalent ion impurities such as $Na^+$, $K^+$, and the like may be easily removed by using the solubility characteristic difference without using separate chemicals. However, a small amount of lithium dissolved in the remaining solution may be still present even after the hot-water washing, and accordingly, in order to completely recover the lithium, the remaining solution may proceed to the electrodialysis process and be reused.

Referring to FIGS. 1 to 3, embodiments of the present invention are comprehensively explained, but each embodiment of the present invention may be performed separately or in other specific ways. Therefore, the aforementioned explanations are exemplary in all the ways but not limited thereto.

The invention claimed is:

1. A method for producing lithium hydroxide, comprising chemically purifying a lithium-containing solution to remove divalent ion impurities;
performing a bipolar electrodialysis of a lithium-containing solution from which divalent ion impurities are removed, concentrating lithium in the lithium-containing solution, and at the same time, converting the lithium to lithium hydroxide; and
performing an electrodialysis of the solution containing the lithium hydroxide to concentrate lithium therein, after the step of performing the bipolar electrodialysis of the lithium-containing solution from which divalent ion impurities are removed,
wherein the bipolar electrodialysis is performed using a bipolar electrodialysis device including an anode cell containing an anode, a first bipolar membrane, an anion selective-type dialysis membrane, a cation selective-type dialysis membrane, a second bipolar membrane, a cathode cell containing a cathode in a sequential order, an acidic solution tank outside the anode cell, and a basic solution tank outside the cathode cell, wherein a solution between the first bipolar membrane and the anion selective-type dialysis membrane is circulated through the acidic solution tank, and a solution between the second bipolar membrane and the cation selective-type dialysis membrane is circulated through the basic solution tank,
the step of performing bipolar electrodialysis of a lithium-containing solution from which divalent ion impurities are removed, concentrating lithium in the lithium-containing solution, and at the same time, converting the lithium to lithium hydroxide includes injecting the lithium-containing solution from which divalent ion impurities are removed between the anion selective-type dialysis membrane and the cation selective-type dialysis membrane in the bipolar electrodialysis device and injecting water between the first bipolar membrane and the anion selective-type dialysis membrane and between the second bipolar membrane and the cation selective-type dialysis membrane, respectively; and applying a current to the bipolar electrodialysis device to which lithium-containing solution from which divalent ion impurities are removed and the water are injected to form an acidic solution between the first bipolar membrane and the anion selective-type dialysis membrane and to form a basic solution including the lithium hydroxide between the cation selective-type dialysis membrane and the second bipolar membrane,
a weight ratio of an amount of water relative to an amount of the lithium-containing solution from which divalent ion impurities are removed (water:lithium-containing solution from which divalent ion impurities are removed) is 1:1 to 1:5, and
the step of performing electrodialysis of the solution containing the lithium hydroxide to concentrate lithium therein includes feeding the solution containing the lithium hydroxide to a dilute compartment of an electrodialysis device.

2. The method for producing lithium hydroxide of claim 1, wherein
the step of applying a current to the bipolar electrodialysis device to which lithium-containing solution from which divalent ion impurities are removed and the water are injected to form an acidic solution between the first bipolar membrane and the anion selective-type dialysis membrane and to form a basic solution including the lithium hydroxide between the cation selective-type dialysis membrane and the second bipolar membrane includes
hydrolyzing the water at each surface of the first bipolar membrane and the second bipolar membrane to generate a proton and a hydroxide ion;
passing the lithium ion in the lithium-containing solution from which divalent ion impurities are removed through the cation selective-type dialysis membrane and moving it toward the cathode direction; and
concentrating the hydroxide ion generated on the surface of the second bipolar membrane and the moved lithium ion between the cation selective-type dialysis membrane and the second bipolar membrane to form the basic solution including lithium hydroxide;
passing an anion in the lithium-containing solution from which divalent ion impurities are removed through the anion selective-type dialysis membrane and moving it toward the anode direction; and
concentrating a proton generated on the surface of the first bipolar membrane and the moved anion between the first bipolar membrane and the anion selective-type dialysis membrane to form the acidic solution.

3. The method for producing lithium hydroxide of claim 1, wherein
in the step of applying a current to the bipolar electrodialysis device to which lithium-containing solution from which divalent ion impurities are removed and the water are injected to form an acidic solution between the first bipolar membrane and the anion selective-type dialysis membrane and to form a basic solution including the lithium hydroxide between the cation selective-type dialysis membrane and the second bipolar membrane,
a concentration of lithium in the solution containing the lithium hydroxide is greater than or equal to 5 g/L.

4. The method for producing lithium hydroxide of claim 1, wherein
after the step of performing bipolar electrodialysis of a lithium-containing solution from which divalent ion impurities are removed, concentrating lithium in the lithium-containing solution, and at the same time, converting the lithium to lithium hydroxide,
the method further includes
concentrating the solution containing the lithium hydroxide to crystallize the same; and
drying the crystallized lithium hydroxide to obtain lithium hydroxide in a powder form.

5. The method for producing lithium hydroxide of claim 1, wherein
in the step of performing electrodialysis of the solution containing the lithium hydroxide to concentrate lithium in the solution containing the lithium hydroxide,
a desalting solution remaining after the electrodialysis is concentrated by a reverse osmosis method and reused in the electrodialysis.

6. The method for producing lithium hydroxide of claim 1, wherein chemically purifying a lithium-containing solution to remove divalent ion impurities comprises
a primary chemical purification step of putting calcium hydroxide in the lithium-containing solution; and
a secondary chemical purification step of putting caustic soda, sodium carbonate, or sodium sulfate to the primarily chemically purified lithium-containing solution.

7. The method for producing lithium hydroxide of claim 1, wherein
in the step of chemically purifying a lithium-containing solution to remove divalent ion impurities,
the removed divalent ion impurities includes
at least one selected from the group consisting of a magnesium ion, a sulfuric acid ion, and a calcium ion.

8. The method for producing lithium hydroxide of claim 1, wherein the lithium-containing solution is selected from a group consisting of a sea-dissolved-lithium extracting solution, a wasted lithium battery recycle process solution, a lithium ore extracting solution, brine, and a combination thereof.

9. A method of producing lithium carbonate, comprising
chemically purifying a lithium-containing solution to remove divalent ion impurities;
performing bipolar electrodialysis of a lithium-containing solution from which divalent ion impurities are removed, concentrating lithium in the lithium-containing solution, and at the same time, converting the lithium to lithium hydroxide;
performing an electrodialysis of the solution containing the lithium hydroxide to concentrate lithium therein, after the step of performing the bipolar electrodialysis of the lithium-containing solution from which divalent ion impurities are removed, and
carbonating the solution containing the lithium hydroxide to precipitate lithium carbonate,
wherein the bipolar electrodialysis is performed using a bipolar electrodialysis device including an anode cell containing an anode, a first bipolar membrane, an anion selective-type dialysis membrane, a cation selective-type dialysis membrane, a second bipolar membrane, a cathode cell containing a cathode in a sequential order, an acidic solution tank outside the anode cell, and a basic solution tank outside the cathode cell, wherein a solution between the first bipolar membrane and the anion selective-type dialysis membrane is circulated through the acidic solution tank, and a solution between the second bipolar membrane and the cation selective-type dialysis membrane through the basic solution tank,
the step of performing bipolar electrodialysis of a lithium-containing solution from which divalent ion impurities are removed, concentrating lithium in the lithium-containing solution, and at the same time, converting the lithium to lithium hydroxide includes injecting the lithium-containing solution from which divalent ion impurities are removed between the anion selective-type dialysis membrane and the cation selective-type dialysis membrane in the bipolar electrodialysis device and injecting water between the first bipolar membrane and the anion selective-type dialysis membrane and between the cation selective-type dialysis membrane and the second bipolar membrane, respectively; and
applying a current to the bipolar electrodialysis device to which lithium-containing solution from which divalent ion impurities are removed and the water are injected to form an acidic solution between the first bipolar membrane and the anion selective-type dialysis membrane and to form a basic solution including the lithium hydroxide between the cation selective-type dialysis membrane and the second bipolar membrane,
a weight ratio of an amount of water relative to an amount of the lithium-containing solution from which divalent ion impurities are removed (water:lithium-containing solution from which divalent ion impurities are removed) is 1:1 to 1:5, and
the step of performing electrodialysis of the solution containing the lithium hydroxide to concentrate therein includes feeding the solution containing the lithium hydroxide to a dilute compartment of an electrodialysis device.

10. The method of producing lithium carbonate of claim 9, wherein the step of applying a current to the bipolar electrodialysis device to which lithium-containing solution from which divalent ion impurities are removed and the water are injected to form an acidic solution between the first bipolar membrane and the anion selective-type dialysis membrane and to form a basic solution including the lithium hydroxide between the cation selective-type dialysis membrane and the second bipolar membrane includes
hydrolyzing the water at each surface of the first bipolar membrane and the second bipolar membrane to generate a proton and a hydroxide ion;
passing a lithium ion in the lithium-containing solution from which divalent ion impurities are removed through the cation selective-type dialysis membrane and moving it toward the cathode direction; and
concentrating a hydroxide ion generated on the surface of the second bipolar membrane and the moved lithium ion between the cation selective-type dialysis membrane and the second bipolar membrane to form a basic solution including the lithium hydroxide;
passing an anion in the lithium-containing solution from which divalent ion impurities are removed through the anion selective-type dialysis membrane and moving it toward the anode direction; and
concentrating a proton generated from the surface of the first bipolar membrane and the moved anion between the first bipolar membrane and the anion selective-type dialysis membrane and forming the acidic solution.

11. The method of producing lithium carbonate of claim 9, wherein
in the step of applying a current to the bipolar electrodialysis device to which lithium-containing solution from which divalent ion impurities are removed and the water are injected to form an acidic solution between the first bipolar membrane and the anion selective-type dialysis membrane and to form a basic solution including the lithium hydroxide between the cation selective-type dialysis membrane and the second bipolar membrane,
a concentration of lithium in the solution containing the lithium hydroxide is greater than or equal to 5 g/L.

12. The method of producing lithium carbonate of claim 9, wherein
in the step of performing electrodialysis of the solution containing the lithium hydroxide to concentrate lithium in the solution containing the lithium hydroxide,
a desalting solution remaining after the electrodialysis is concentrated by a reverse osmosis method and reused in the electrodialysis.

13. The method of producing lithium carbonate of claim 9, wherein
the step of carbonating a solution containing the lithium hydroxide to precipitate lithium carbonate is performed by
injecting sodium carbonate or carbon dioxide into the solution containing the lithium hydroxide.

14. The method of producing lithium carbonate of claim 9, wherein
after the step of carbonating a solution containing the lithium hydroxide to precipitate lithium carbonate,
the method further includes removing alkali metal ion impurities in the precipitated lithium carbonate by hot-water washing using a solubility difference, wherein a temperature of the hot-water is at least 80° C.

15. The method of producing lithium carbonate of claim 14, wherein
in the step of hot-water washing the precipitated lithium carbonate to obtain lithium carbonate from which the alkali metal ion impurities are removed,
a remaining solution after the hot-water washing is used for the step of carbonating.

16. The method of producing lithium carbonate of claim 9, wherein the step of chemically purifying a lithium-containing solution to remove divalent ion impurities comprises
a primary chemical purification of putting calcium hydroxide in a the lithium-containing solution; and
a secondary chemical purification of putting caustic soda, sodium carbonate, or sodium sulfate in the primarily chemically purified lithium-containing solution.

17. The method of producing lithium carbonate of claim 9, wherein
in the step of chemically purifying a lithium-containing solution to remove divalent ion impurities,
the removed divalent ion impurities includes
at least one selected from the group consisting of a magnesium ion, a sulfuric acid ion, and a calcium ion.

18. The method of producing lithium carbonate of claim 9, wherein the lithium-containing solution is selected from a group consisting of a sea-dissolved-lithium extracting solution, a wasted lithium battery recycle process solution, a lithium ore extracting solution, brine, and a combination thereof.

* * * * *